Patented Sept. 1, 1942

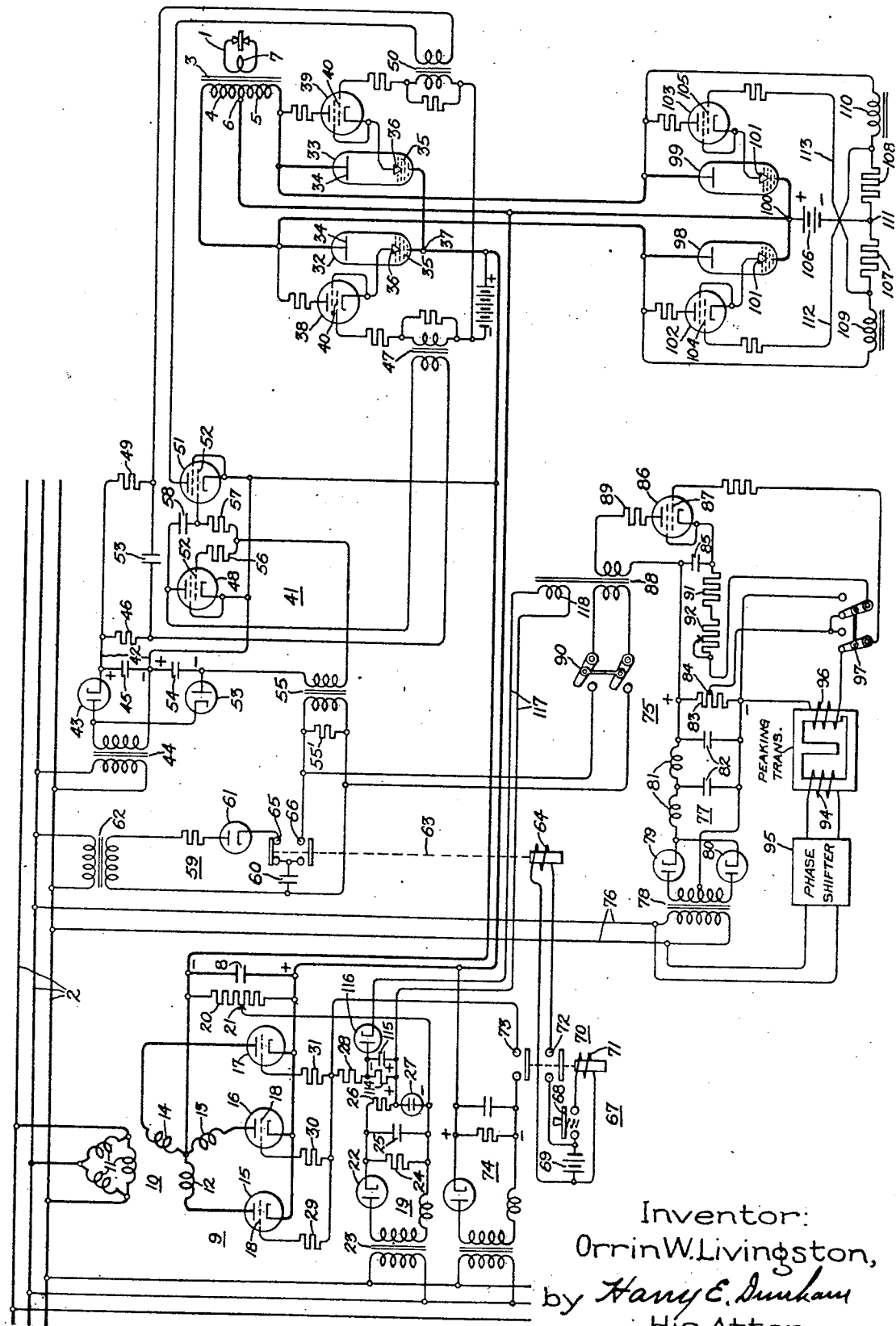

2,294,671

UNITED STATES PATENT OFFICE 2,294,671

ELECTRIC TRANSLATING SYSTEM

Orrin W. Livingston, Scotia, N. Y., assignor to General Electric Company, a corporation of New York Application December 18, 1941, Serial No. 423,523

33 Claims. (Cl. 171—97)

My invention relates to electric translating systems, and more particularly to electric translating systems employing energy storage means.

Electric translating apparatus employing energy storage apparatus offers decided advantages for those applications where it is desired to transmit a substantial amount of power to a load circuit in a relatively short interval of time. For example, in energy storage systems comprising electrostatic energy storage means, such as capacitances, the capacitances may be charged from an associated supply circuit during a relatively long interval of time, thereby relieving the duty imposed on the supply circuit, and may be discharged to effect energization of the load circuit, effecting the transfer of power to the load circuit at a relatively high rate. In accordance with the teachings of my invention described hereinafter, I provide new and improved electric translating apparatus, of the energy storage type, which is susceptible of higher rates of operation than that obtainable by the prior art arrangements.

It is an object of my invention to provide a new and improved electric translating system.

It is another object of my invention to provide new and improved electric translating apparatus of the electrostatic energy storage type.

It is a further object of my invention to provide new and improved control circuits for electric valve translating apparatus.

Briefly stated, in the illustrated embodiment of my invention I provide new and improved electric valve translating apparatus for controlling the transfer of energy to a load circuit, such as a welding circuit, from a capacitance which is charged from a supply circuit. Apparatus built in accordance with my invention is susceptible of operating at a higher rate than the prior art arrangements; that is, the capacitance may be charged and discharged at higher rates, thereby increasing the number of energizations of the load circuit, or welding circuit, which may be effected during a predetermined interval of time.

For a better understanding of my invention, reference may be had to the following description taken in connection with the accompanying drawing, and its scope will be pointed out in the appended claims.

Referring now to the single figure of the drawing, my invention is there illustrated as applied to an electric translating system for effecting energization of a load circuit, such as a welding circuit 1, from a supply circuit, such as a polyphase alternating current supply circuit 2. Transforming means, such as a transformer 3, is provided and includes primary winding means such as a pair of primary winding sections 4 and 5 having a common connection 6. Secondary winding means or secondary winding 7 is connected to the welding circuit 1.

Energy storage means, which may be an electrostatic energy storage means such as a capacitance 8, is connected to be charged from the supply circuit 2 through a rectifying or charging circuit 9 comprising a transformer 10 having a plurality of primary windings 11 and secondary windings 12, 13 and 14. Rectifying means, such as electric valves 15, 16 and 17, are connected between the windings 12—14 and the capacitance 8 to charge the latter. The electric valve means 15—17, inclusive, may be of the type including control members or grids 18, the potential of which determines the amount of current transmitted to the capacitance 8.

In order to control the charging current transmitted by the electric valves 15—17 and to charge the capacitance 8 to a predetermined voltage, I provide a control circuit 19 which produces a constant reference voltage which is compared with a predetermined component of the capacitance voltage derived from a voltage divider connected across the capacitance 8. The voltage divider may comprise a resistance 20 having an adjustable contact 21 to provide a negative adjustable component of voltage which is compared with the positive constant reference voltage provided by circuit 19. Adjustment of contact 21 controls the voltage to which the capacitance 8 is charged by the charging circuit 9. Circuit 19 may comprise a rectifier 22, a transformer 23, a resistance 24, through which unidirectional current is transmitted to produce across its terminals a substantially constant voltage. A filtering capacitance 25 may be connected across resistance 24, if desired. In order to provide a substantially constant reference voltage, I connect in circuit 19 a serially connected resistance 26 and a constant voltage device, such as a glow discharge valve 27, which maintains across its terminals a substantially constant voltage when maintained in a conducting or ionized condition. The upper terminal of glow discharge valve 27 is connected to the grids 18 of electric valve means 15—17 through a resistance 28 and resistances 29—31.

Certain features of the charging circuit for the capacitance 8 are being disclosed and claimed in the copending patent application of Louis G.

Levoy, Jr., Serial No. 384,247, filed March 20, 1941, and which is assigned to the assignee of the present application.

In the prior art arrangements where capacitive or energy storage means have been employed and where the capacitance has been discharged through inductive apparatus in order to effect energization of the load circuit, it has been important and necessary in many instances to reverse the connections of the primary windings of the power transformer in order to obtain symmetry in the welding current and uniformity of the welds produced thereby. This reversal of the direction of current flow through the primary winding of the transformer was made in order to prevent cumulative unidirectional magnetization of the core member of the transformer. In some instances, the connection of the primary winding to the capacitance of the system was accomplished by means of mechanical reversing devices which by nature are relatively slow in operation, thereby imposing a substantial limitation on the speed of operation of the system as a whole and thereby limiting the possible range of application of apparatus of this nature.

In order to obtain a large number of energizations of the welding circuit 1 for a given interval of time, I provide an arrangement where reversals of the connections of the capacitance are unnecessary, and which attains the desired high speed of operation without effecting cumulative unidirectional magnetization of the core member. More particularly, I provide means, such as electric valve means 32 and 33, which are connected to the primary winding sections 4 and 5 and are also connected to the capacitance 8. The electric valve means 32 and 33 are preferably of the type employing an ionizable medium, such as a gas or a vapor, and each comprises an anode 34, a cathode such as a mercury pool cathode 35, and a control member 36 which may be of the immersion-igniter type having an extremity thereof immersed in the pool of the cathode, and constructed of a material such as boron-carbide and silicon-carbide and having an electrical resistivity comparatively large relative to that of mercury.

It will be noted that the common juncture 37 of cathodes 35 is connected to one terminal, such as the negative terminal, of capacitance 8 and that the anodes 34 of the electric valve means 32 and 33 are connected to the primary winding sections 4 and 5, respectively. The common juncture 6 of primary winding sections 4 and 5 is connected to the lower or positive terminal of the capacitance 8. In this manner, the electric valve means 32 and 33 serve as means for effecting selective and alternate energization of the primary winding sections 4 and 5, and by virtue of the polarities of the electric valve means 32 and 33 the directions of the currents transmitted through winding sections 4 and 5 are opposite so that consecutive energizations of the transformer 3 produce magnetomotive forces in opposition, thereby preventing cumulative unidirectional magnetization of the core member.

As a means for controlling the conductivities of the electric valve means 32 and 33, I employ control electric valves 38 and 39 which may be connected to be responsive to the magnitude and polarity of the anode-cathode voltage of the associated main electric valves 32 and 33. The control electric valves 38 and 39 may also be of the type employing an ionizable medium, and each includes an anode-cathode circuit connected between the anode 34 and control member 36 of the respective associated main or power electric valves. Electric valves 38 and 39 each may comprise a control member, such as a grid 40 which controls the conductivity thereof and also controls the time of energization of the immersion-ignited control members 36.

It is important that the electric valve means 32 and 33 conduct current alternately in order that cumulative unidirectional magnetization of the core member of transformer 3 be prevented. I, therefore, provide a control circuit 41 which causes alternate conduction of the electric valve means 32 and 33 in response to the occurrence of impulses of control voltage. Circuit 41 comprises a source of direct current 42 which may be provided by a suitable rectifier 43 energized from supply circuit 2 through a transformer 44. A capacitance 45 is connected across the output circuit of the rectifier, and a unidirectional voltage of the polarity indicated appears across its terminals. Circuit 41 also includes a pair of electric paths one of which comprises in series relation an impedance element, such as a resistance 46, a part of the grid circuit of control electric valve 38, such as a transformer 47, and an electric discharge device 48. The other electric path includes an impedance element, such as a resistance 49, a part of the grid circuit for control electric valve 39, such as a transformer 50, and an electric discharge device 51. The electric discharge devices 48 and 51 may be of the type employing an ionizable medium, such as a gas or a vapor, and each includes a control member such as a grid 52 which serves to render the discharge device conducting. Suitable commutating means, such as a commutating capacitance 53, is connected across the parallel electric paths and serves to effect the transfer of current from a conducting discharge device to a nonconducting discharge device, when the nonconducting discharge device is rendered conducting.

As a means for producing a suitable negative unidirectional biasing potential which is impressed on grids 52 of electric discharge devices 48 and 51, I may employ an auxiliary rectifier comprising a unidirectional conducting device or rectifier 53 and a capacitance 54. The negative voltage appearing across capacitance 54 is impressed on grids 52 of discharge devices 48 and 51 through a secondary winding of transformer 55 and resistances 56 and 57. The control voltage which serves to operate the discharge devices 48 and 51 is transmitted by transformer 55, which is energized by apparatus described hereinafter. In order to assure that only one of the discharge devices 48 or 51 is rendered conducting upon the occurrence of an impulse of control voltage during initiation of operation of the circuit 41, I provide means for producing dissymmetry of the voltages impressed on grids 52 of these discharge devices. For example, I provide a capacitance 58 which may be connected from the anode of the discharge device 48 to the grid 52 of discharge device 51.

Transformers 47 and 50 associated with control electric valves 38 and 39, respectively, when energized serve to render these electric valves conducting and effect the transmission of energizing impulses of current to the control members 36 of electric valve means 32 and 33.

Impulses of control voltage are impressed on grids 52 of electric discharge devices 48 and 51 by transformer 55. Transformer 55, in turn, is energized by a control or initiating circuit 59 which may comprise a capacitance 60 which is charged through a rectifier 61 from a transformer 62 which is energized from the alternating current supply circuit 2. Circuit control means, such as a relay 63, provided with an actuating coil 64 and contacts 65 and 66 may be employed to control the time of energization of transformer 55 and to control thereby the time of operation of control circuit 41, and the time at which either the electric valve means 32 or 33 is rendered conducting. In this manner, the time of energization of the welding circuit 1 is also controlled. Contacts 65 and 66 of relay 63 are connected in the charging circuit for capacitance 60, and contacts 66 are connected in the discharge circuit for capacitance 69. The discharge circuit includes the primary winding of transformer 55. If desired, a resistance 55' may be connected across the primary winding of transformer 55 to provide a path for the dissipation of energy stored in transformer 55. Contacts 65 and 66 of relay 63 are arranged so that when one set of contacts is closed, the other set is open.

Transmission of current to the welding circuit 1 may be controlled by means of a circuit 67 which may include a manually operable switch 68, a source of energizing current such as a battery 69, and a relay 70. Relay 70 is provided with an actuating coil 71 and contacts 72 and 73, the former of which are connected in circuit with the actuating coil 64 of relay 63 so that upon closure of the manually operable switch 68, relay 63 is energized causing discharge of capacitance 60 through transformer 55 and thereby initiating the transmission of welding current to the welding circuit 1.

It is important to prevent charging of the capacitance 8 during the discharging of the capacitance. In order to prevent charging of the capacitance 8, I provide a circuit 74 which impresses on the grids 18 of the electric valves 15—17 a negative unidirectional biasing potential sufficient to maintain the electric valves nonconducting when relay 70 is energized. This circuit is completed through contacts 73 of relay 70, and the contacts 73 are arranged to be closed simultaneously with the closure of contacts 72.

In some applications, it is desirable to effect recurrent or intermittent energizations of the welding circuit 1. In this instance, the recurrent or intermittent energizations of the welding circuit 1 may be accomplished by transmitting to the transformer 55 a series of impulses of control voltage so that circuit 41 operates intermittently or periodically.

As a means for supplying a series of impulses to the transformer 55, I provide a timing circuit 75 which may be energized from the supply circuit 2 through circuit 76. Circuit 75 comprises a rectifier 77 which may be of the bi-phase type including a transformer 78 and rectifying means 79 and 80. Filtering means comprising inductances 81 and capacitances 82 may be connected to the output circuit of the rectifier 77 to produce across the terminals of a voltage divider a substantially constant unidirectional voltage. The voltage divider may comprise a resistance 83 having a movable tap or contact 84. In order to produce a periodic timing voltage, I employ a capacitance 85 which is charged from the rectifier 77 and which is periodically discharged by an electric valve or electric discharge device 86. Electric discharge device 86 is provided with a grid 87, the potential of which periodically rises to a value sufficient to render the discharge device 86 conducting and thereby effects discharge of the capacitance 85 through a circuit including a transformer 88, a resistance 89 and the anode-cathode circuit of discharge device 86. A suitable switch 90, which may be manually or automatically operated, is connected between transformer 55 and transformer 88 of circuit 75. Means for controlling the period of the periodic voltage produced by circuit 75, such as resistances 91 and 92, may be connected in circuit with capacitance 85.

In order to increase the speed of operation of the translating system, I provide means for synchronizing the occurrence of the periodic voltage produced by timing circuit 75 relative to the voltage of supply circuit 2. It will be appreciated that when it is desired to effect a large number of energizations of the welding circuit 1 during a given interval of time, it is important to correlate the time of occurrences of the periodic voltages relative to the charging time of the capacitance 8 and the time of discharge of the capacitance 8 through either of the primary winding sections 4 and 5 of transformer 3. Furthermore, the period of the periodic voltage produced by timing circuit 75 has a definite relationship with respect to the charging time of the capacitance 8 and the discharge time of capacitance 8. The timing circuit 75 is, therefore, arranged or designed to produce the maximum number of timing impulses for a given interval of time commensurate with the charging time of capacitance 8 and the discharge time of this capacitance. For example, the period of the periodic timing voltage produced by circuit 75, that is the interval of time between the consecutive occurrences of the value thereof which is sufficient to operate circuit 41, is equal to or greater than the sum of the charging interval of capacitance 8 and the discharging period for capacitance 8. Of course, in order to obtain the maximum number of energizations of the welding circuit for a given interval of time, the period of the timing voltage produced by circuit 75 should be equal to the sum of the charging interval and the discharging interval for capacitance 8.

I provide means for synchronizing the operation of circuit 75 relative to the voltage of supply circuit 2, and therefore provide means for establishing a base or reference timing point in order to maintain the above described desired relationship between the charging time and the discharging time of capacitance 8 and the period of the periodic timing voltage produced by circuit 75. This synchronizing means may comprise a means, such as a peaking transformer, which synchronizes the operation of the electric valve 86 relative to the voltage of supply circuit 2. The peaking transformer may comprise a primary winding 94 which is energized from circuits 2 and 76 through a suitable phase shifter 95. Secondary winding 95 of peaking transformer is connected to the negative terminal of resistance 83 and grid 87 of electric valve 86 through a switch 97. When switch 97 is in the position indicated, circuit 75 is connected for synchronous operation relative to the voltage of circuit 2. When in this position, capacitance 93 is connected to the adjustable contact 84 of resistance 83. Switch 97 is also arranged to effect asynchronous operation of the system where synchronous operation is not required or desired. For example, switch 97 when placed in the right-hand position effectively disconnects the synchronizing or peaking transformer and connects resistance 92 to the negative terminal of resistance 83 and connects grid 87 of electric valve 86 to adjustable contact 84 of resistance 83.

To limit the magnitude of the reverse or inverse voltage which tends to appear across the primary winding sections 4 and 5 of transformer 3 near the end of each discharge period of capacitance 8, I provide means for selectively short circuiting the primary winding sections 4 and 5. Since the discharge circuit for capacitance 8 includes an appreciable inductance furnished by primary winding sections 4 and 5, it will be understood that the discharge circuits for capacitance 8 are oscillatory. Therefore, there is a tendency for the system to establish a reverse charge on capacitance 8 at the end of each discharge period. In order to limit the magnitude of this reverse charge, I connect across the primary winding sections 4 and 5 a pair of electric valve means 98 and 99 which are oppositely poled relative to each other, and which have a common juncture 100 connected to the common connection 6 of primary winding sections 4 and 5 of transformer 3. The electric valve means 98 and 99 are also preferably of the type employing an ionizable medium and each may include a control member 101 of the immersion-igniter type. I may also employ in connection with electric valves 98 and 99 control electric discharge devices 102 and 103 which are connected to be responsive to the respective anode-cathode voltages, and which may comprise grids 104 and 105 which render the discharge devices 102 and 103 conducting.

Electric discharge devices 102 and 103 are normally maintained nonconducting by impressing thereon a suitable biasing potential, such as a negative biasing potential furnished by a battery 106. I provide means responsive to the polarity of the voltage of the primary winding means 4 and 5 of transformer 3 for selectively rendering the electric valve means 98 and 99 conducting after or near the end of the discharge of the capacitance 8 at a time when the voltage across windings 4 and 5 tends to reverse polarity, or reverses in polarity to a voltage which is of sufficient magnitude to render the electric valve means 98 and 99 conducting. For example, I may connect across the outside terminals of primary winding sections 4 and 5 a voltage divider which may include two pairs of serially connected resistances 107, 108 and inductances 109, 110. The common juncture 111 is connected to the common juncture 100 of electric valves 98 and 99 through battery 106. Criss-cross connections 112 and 113 are provided between the junctures of resistance 108 and inductance 110, resistance 107 and inductance 109, and grids 104 and 105 of the control electric discharge devices 102 and 103. The inductances 109 and 110 serve to produce positive firing voltages for electric discharge devices 102 and 103 which continue into the region in which the reversal of polarity of primary winding sections 4 and 5 becomes effective, so that when the anode-cathode voltages of the electric valve means 98 and 99 become sufficiently positive, the voltages produced by resistances 108 and 107 are effective to render the electric discharge devices 102 and 103 respectively conducting.

When the system is operating to effect intermittent operation of the welding circuit 1, it is, of course, necessary to maintain the electric valves 15—17, inclusive, of the charging circuit 9 nonconducting. The charging circuit 9 may be prevented from operating during the discharging operation of the capacitance 8 by controlling the control circuit 19 in response to the operation of the timing circuit 75. For example, I may employ suitable means, such as a parallel connected resistance 114 and a capacitance 115, which introduce into the control circuit 19 a negative unidirectional biasing potential sufficiently large in magnitude to maintain the electric valve means 15—17 nonconducting during the discharging operation of the capacitance 8. The capacitance 115 may be charged to the polarity indicated by an electric valve or unidirectional conducting device 116 from a circuit 117 which is energized from the timing circuit 75. If desired, circuit 117 may be energized from a secondary winding 118 of transformer 88.

The operation of the embodiment of my invention shown in the single figure of the drawing will be explained by considering the system when it is operating to effect the energization of the welding circuit 1 by transmitting thereto either a single energizing impulse or current, or by transmitting thereto recurring impulses of current. The capacitance 8 is charged from the supply circuit 2 by charging circuit 9. The electric valves 15—17 transmit unidirectional current to the capacitance 8, and the operation of the electric valves 15—17 is controlled by means of circuit 19. As the voltage of the capacitance increases and approaches the desired value, the negative component of voltage derived from resistance 20 increases in magnitude, and when it increases sufficiently to overcome completely the effect of the positive reference voltage the electric valves 15—17 are rendered nonconducting.

Energization of the welding circuit 1 may be initiated by closure of the manually operable switch 68. Closure of this switch energizes actuating coil 71 of relay 70 which performs two operations. The first operation is the impression of a negative hold-off voltage on grids 18 of electric valve means 15—17. The voltage is derived from circuit 74 and prevents operation of the charging circuit 9. The second operation is the initiation of the operation of circuit 41. The capacitance 60, which has previously been charged by circuit 59, is discharged to effect energization of transformer 55. Upon operation of relay 63, it closes its contacts 66 and opens the charging circuit for capacitance 60. An impulse of positive voltage is thereby impressed on grids 52 of electric discharge devices 48 and 51, causing one of these discharge devices to be rendered conducting. Due to the capacitance 58 which establishes the dissymmetry in the control voltages impressed on grids 52, the discharge device 51 will conduct current initially. The transmission of current by discharge device 51 effects energization of transformer 50, inducing in the secondary winding thereof a sharp or peaked voltage of short duration and of sufficient magnitude to render the electric valve 39 conducting. As a result thereof, an energizing impulse of current is transmitted to immersion-igniter control member 36 of electric valve means 33, thereby rendering this electric valve means conducting and causing the discharge of capacitance 8 through the primary winding section 5 of transformer 3. Consequently, an impulse of welding current is transmitted to the welding circuit 1.

Due to the oscillatory nature of the circuit including primary winding section 5 and capacitance 8, the capacitance 8 will tend to charge in the reverse direction. The magnitude of the voltage to which the capacitance 8 is charged in the reverse direction is limited by electric valve means 99 which is connected across winding section 5. The manner in which the electric valve means 99 limits the magnitude of the reverse current will now be considered.

During the discharge period of capacitance 8 through primary winding section 5, the upper terminal of the primary winding section 4 is the most positive portion of the primary winding means, and the negative terminal of the primary winding section 5 is the most negative portion of the primary winding means. Consequently, the anode of electric valve means 99 is negative relative to its cathode and the electric valve means 99 cannot conduct current. The voltage divider including resistances 107 and 108 and inductances 109 and 110 are connected across the primary winding means 4 and 5, and the voltage produced by this voltage divider, particularly resistance 107, during this interval is a positive voltage sufficient in magnitude to overcome the effect of the biasing battery 106. In this manner there is provided a positive voltage which tends to render the control electric discharge device 103 conducting even during the discharge period of the capacitance 8. However, since the anode voltage impressed across electric valve means 99 is of the wrong polarity, the voltage produced by resistance 107 is ineffective to render either the discharge device 103 or the electric valve means 99 conducting. When, however, the voltage of the capacitance 8 reverses slightly, the anode voltage impressed on electric discharge device 103 and electric valve means 99 becomes positive cooperating with the positive firing voltage produced by resistance 107 which continues even though the voltage of the circuit from which it is energized has reversed polarity. The reason that the firing voltage continues into the region where the primary winding means reverses its polarity is the presence of the inductances 109 and 110 which are designed to maintain the flow of current through the voltage divider for an appreciable interval of time after the reversal of the voltage impressed across the primary winding means. To summarize, as soon as the voltage of the primary winding section 5 reverses polarity and increases to a sufficient magnitude, the electric valve means 99 is rendered conducting, thereby effectively short circuiting the primary winding means 5 and limiting the magnitude of the reverse voltage to which the capacitance 8 may be charged.

The system may be re-initiated in its operation by opening the manually operable switch 68. Capacitance 8 is recharged from supply circuit 2, and the transmission of another impulse of welding current to welding circuit 2 may be initiated by closure of switch 68. In the meantime, the capacitance 60 has also been charged by circuit 59, and upon closure of switch 68 the capacitance 60 is again discharged through transformer 55. Due to the previously described sequence of operation, the electric discharge device 51 has been maintained in a conducting condition due to the fact that its anode-cathode circuit is energized from a source of continuous or direct current. The impression of a positive impulse of voltage on grids 52 of discharge devices 48 and 51 renders the discharge device 48 conducting. As a result thereof, due to the operation of the commutating capacitance 53, current is commutated from the discharge device 51 to discharge device 48. The flow of current to electric discharge device 48 energizes transformer 47 which produces a peaked voltage to render the electric discharge device 38 and electric valve means 32 conducting. Upon being rendered conducting, the electric valve means 32 discharges the capacitance 8 through the primary winding section 4 effecting energization of the welding circuit 1. The electric valve means 98, which is connected across the primary winding section 4, limits the magnitude of the reverse voltage to which the capacitance 8 may be charged, in the same manner as the electric valve means 99 limits the voltage of capacitance 8 after discharge of the capacitance through primary winding means 5. As soon as the voltage of capacitance 8 tends to reverse, the reversal in anode-cathode voltage of the electric discharge device 102 and the electric valve means 98, cooperating with the positive firing voltage produced by resistance 108, causes electric valve means 98 to conduct current, short circuiting, or shunting the primary winding section 4. It is to be noted that prior to the reversal of voltage of capacitance 8, the anode-cathode voltages of discharge device 102 and electric valve means 98 are of the reversed polarity to permit conduction by this apparatus. However, during the discharge period of capacitance 8, the lower terminal of primary winding section 5 is positive, and the upper terminal of primary winding section 4 is negative, effecting the transmission of current through the voltage divider to impress on grid 104 of electric discharge device 102 a positive firing voltage which is sufficient to overcome the effect of the bias voltage produced by battery 106. This positive firing voltage continues in effect into the region in which the capacitance voltage reverses, thereby causing conduction by electric discharge device 102 and electric valve means 98 as soon as the anode-cathode voltage reaches a value sufficient to cause conduction. As explained above, the continuance of this positive firing voltage is due to inductances 109 and 110.

Referring now more particularly to the operation of control circuit 41, this circuit assures alternate conduction of electric valve means 32 and 33 by effecting alternate energization of the transformers 47 and 50. This alternate energization is effected by virtue of the fact that the discharge devices 48 and 51 are alternately rendered conducting in response to the occurrence of consecutive impulses of control voltage produced by transformer 55. An impulse of control voltage derived from transformer 55 causes whichever discharge device is nonconducting to become conducting, and causes the other discharge device to be rendered nonconducting. Accordingly, alternate energization of transformers 47 and 48 is assured.

When it is desired to effect intermittent energization of the welding circuit 1, the timing circuit 75 may be employed instead of the manually operable switch 68. Switch 90 is closed, effectively connecting circuit 75 to transformer 55. If the switch 97 is maintained in the left-hand position indicated in the drawing, circuit 75 controls the translating system to operate synchronously with respect to the voltage of supply circuit 2. The timing circuit 75 produces a periodic timing voltage which is supplied to the transformer 55 to effect periodic energization of welding circuit 1. The period and periodicity of the periodic timing voltage produced by timing circuit 75 may be controlled or adjusted by means of tap 84 associated with resistance 83. In order to effect the transmission of the maximum number of current impulses to the welding circuit 1 within a given interval of time, the period of the periodic voltage is adjusted to have a value substantially equal to the sum of the charging time of capacitance 8 and the discharging time of this capacitance.

Synchronization between the operation of the timing circuit 75 and the voltage of supply circuit 2 is effected by means of the synchronizing effect of the periodic voltage of peaked wave form produced by the peaking transformer. It will be understood that the period of the periodic voltage produced by circuit 75 is several times the period of the voltage of supply circuit 2. For example, the period of this periodic timing voltage may be 10 or 15 times the period of the voltage of supply circuit 2, providing an interval of time equal to the sum of the charging period of the capacitance 8 and the discharge period. Due to the synchronizing feature, drifting of the timing voltage relative to the voltage of supply circuit 2 is prevented, thereby establishing a fixed relation between the time of initiation of each of the impulses of periodic timing voltage and the voltage of circuit 2.

The charging circuit 9 is prevented from operating during the discharging operations of the capacitance 8 when the system effects intermittent energization of the welding circuit 1. Upon the occurrence of each impulse of voltage generated by the control circuit 19, capacitance 115 is charged from the circuit including the unidirectional conducting device 116, circuit 117, and secondary winding 118. This introduces into the control circuit 19 a negative unidirectional hold-off or biasing potential of sufficient magnitude to maintain electric valves 15—17 nonconducting. The discharge circuit for capacitance 115 including resistance 114 is designed to have a time constant so that the capacitance 115 discharges within a proper interval of time so that the negative unidirectional biasing potential decreases to a value which permits recharging of the capacitance 8 after the discharge thereof. In this manner, exact synchronization between the charging and discharging operations of the capacitance 8 and the timing circuit 75 is obtained.

Where synchronous operation relative to the supply voltage is not required or desired, the switch 97 may be moved to the right-hand position whereby the circuit 75 operates to produce a periodic timing voltage which is asynchronous or not in synchronism with the voltage of the supply circuit 2.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current supply circuit, a load circuit, a capacitance, rectifying means for charging said capacitance from said supply circuit, a transformer having primary winding means comprising two winding sections and having a secondary winding means connected to said load circuit, a pair of electric valve means one connected to one of said winding sections and the other connected to the other of said winding sections and both being connected to said capacitance, and means for controlling the conductivities of said electric valve means to discharge said capacitance alternately through said primary winding sections.

2. In combination, an alternating current supply circuit, a load circuit, a transformer having primary winding means comprising two winding sections and having a secondary winding means connected to said load circuit, a capacitance, means for charging said capacitance from said supply circuit comprising a rectifier of the controlled type, means responsive to the voltage of said capacitance for controlling the operation of said rectifier, and a pair of electric valve means each connected between said capacitance and a different one of the primary winding sections, and means for controlling the conductivities of said electric valve means to effect discharge of said capacitance alternately through the primary winding sections.

3. In combination, a supply circuit, a load circuit, a transformer having primary winding means comprising a pair of winding sections and secondary winding means connected to said load circuit, means for charging said capacitance from said supply circuit, a pair of electric valve means each associated with a different one of the primary winding sections for effecting discharge of said capacitance through the associated winding section, each of said electric valve means being of the type comprising a control member for controlling the conductivity thereof, means for producing a control voltage, and means connected between the control members and the last mentioned means for effecting alternate energization of said control members upon occurrence of consecutive impulses of said control voltage.

4. In combination, an alternating current supply circuit, a load circuit, a transformer having primary winding means comprising a pair of primary winding sections provided with an intermediate connection and having secondary winding means connected to said load circuit, a capacitance, rectifying means for charging said capacitance from said supply circuit, a pair of electric valve means connected between the primary winding sections and one terminal of said capacitance, the other terminal of said capacitance being connected to said intermediate connection, said electric valve means each being of the type comprising a control member for rendering the electric valve means conducting, means for producing a control voltage, and means connected between the last mentioned means and the control members for effecting alternate energization of said control members upon the occurrence of consecutive impulses of said control voltage.

5. In combination, a supply circuit, a load circuit, a transformer having primary winding means including a pair of winding sections provided with a common terminal and including secondary winding means connected to said load circuit, a capacitance, means for charging said capacitance from said supply circuit, a pair of electric valve means each connected between one terminal of said capacitance and different primary winding sections, the other terminal of said capacitance being connected to said common terminal, and a second pair of electric valve means connected across said primary winding sections for limiting the magnitude of the inverse voltage appearing across said primary winding sections after each period of discharge of said capacitance through either one of the electric valve means of the first mentioned pair.

6. In combination, a supply circuit, a load circuit, a transformer having primary winding means including a pair of winding sections provided with a common terminal and including secondary winding means connected to said load circuit, a capacitance, means for charging said capacitance from said supply circuit, a pair of electric valve means each connected between one terminal of said capacitance and different primary winding sections, the other terminal of said capacitance being connected to said common terminal, a second pair of electric valve means connected across said primary winding sections for limiting the magnitude of the inverse voltage appearing across said primary winding sections after each period of discharge of said capacitance through either one of the electric valve means of the first mentioned pair, and means for controlling the conductivities of said second pair of electric valve means in response to the polarity of the voltage appearing across said primary winding means.

7. In combination, a supply circuit, a load circuit, electric translating apparatus connected between said circuits and comprising a transformer having primary winding means including a pair of winding sections and secondary winding means connected to said load circuit, means for transmitting current alternately to said primary winding sections, a pair of electric valve means connected to said primary winding sections, said electric valve means being of the type each comprising a control member for controlling the conductivity thereof, and means responsive to the voltage of said primary winding means and connected to the control members for permitting conduction of the electric valve means associated with the respective primary winding sections immediately upon energization thereof.

8. In combination, a supply circuit, a load circuit, electric translating apparatus connected between said circuits and comprising a transformer having primary winding means including a pair of winding sections and secondary winding means connected to said load circuit, means for transmitting current alternately to said primary winding sections, a pair of electric valve means connected across said primary winding sections, said electric valve means being of the type each comprising a control member for controlling the conductivity thereof, and voltage responsive means connected to said primary winding means and connected to the control members for permitting conduction by the electric valve means associated with the respective primary winding sections immediately upon energization thereof.

9. In combination, a supply circuit, a load circuit, a transformer having primary winding means including a pair of winding sections provided with a common connection and secondary winding means connected to said load circuit, means for effecting alternate energization of said primary winding sections comprising a pair of electric valve means each connected to a different one of the primary winding sections, a second pair of electric valve means connected across said primary winding means and being oppositely poled and having a common juncture thereof connected to said common connection, said second pair of electric valve means each being of the type comprising a control member for controlling the conductivity thereof, and means connected to said primary winding means and connected to the control members for controlling the potential thereof.

10. In combination, a supply circuit, a load circuit, a transformer having primary winding means including a pair of winding sections provided with a common connection and secondary winding means connected to said load circuit, means for effecting alternate energization of said primary winding sections comprising a pair of electric valve means each connected to a different one of the primary winding sections, a second pair of electric valve means connected across said primary winding means and being oppositely poled and having a common juncture thereof connected to said common connection, said second pair of electric valve means each being of the type comprising a control member for controlling the conductivity thereof, and voltage responsive means connected to said primary winding means and connected to the control members of said second pair of electric valve means for selectively rendering conducting electric valves of said second pair of electric valve means.

11. In combination, a supply circuit, a load circuit, a transformer having primary winding means including a pair of winding sections provided with a common connection and secondary winding means connected to said load circuit, means for effecting alternate energization of said primary winding sections comprising a pair of electric valve means each connected to a different one of the primary winding sections, a second pair of electric valve means connected across said primary winding means and being oppositely poled and having a common juncture thereof connected to said common connection, said second pair of electric valve means each being of the type comprising a control member for controlling the conductivity thereof, and means responsive to the voltage of said primary winding means and connected to the control members of said second pair of electric valve means for rendering the valves of said second pair selectively conducting upon energization of the respective associated primary winding section.

12. In combination, a supply circuit, a load circuit, a transformer having primary winding means including a pair of winding sections provided with a common connection and secondary winding means connected to said load circuit, means for effecting alternate energization of said primary winding sections comprising a pair of electric valve means each connected to a different one of the primary winding sections, a second pair of electric valve means connected across said primary winding means and being oppositely poled and having a common juncture thereof connected to said common connection, said second pair of electric valve means each being of the type comprising a control member for controlling the conductivity thereof, and a voltage divider connected to be responsive to the voltage of said primary winding means and comprising inductive means tending to render selectively conducting that electric valve of the second mentioned pair upon energization of the associated primary winding section.

13. In combination, a supply circuit, a load circuit, a transformer having primary winding means including a pair of winding sections provided with a common connection and secondary winding means connected to said load circuit, means for effecting alternate energization of said primary winding sections comprising a pair of electric valve means each connected to a different one of the primary winding sections, a second pair of electric valve means connected across said primary winding means and being oppositely poled and having a common juncture thereof connected to said common connection, said second pair of electric valve means each being of the type comprising a control member for controlling the conductivity thereof, and means responsive to the voltage of said primary winding means and comprising a voltage divider including in series relation two pairs of serially connected resistances and inductances, the common juncture of said last mentioned pairs being connected to said common connection.

14. In combination, a supply circuit, a load circuit, a transformer having primary winding means including a pair of winding sections having a common connection and having secondary winding means connected to said load circuit, a capacitance, means for charging said capacitance from said supply circuit and means connected between said capacitance and said primary winding sections for effecting alternate energization thereof by discharging said capacitance, means for limiting the inverse voltage impressed across each of the primary winding sections upon discharge of said capacitance and comprising a pair of electric valve means connected across the primary winding sections, said electric valve means being oppositely poled and having a common juncture connected to said common connection, and means for selectively rendering conducting the electric valves of said pair in response to the voltage of said primary winding means and comprising a voltage divider including two pairs of serially connected resistances and inductances, the common juncture of which is connected to the common connection of the primary winding means, the inductances of the last mentioned pair serving to produce voltages which continue into the region in which the reversal of polarity of voltage across said primary winding means becomes effective.

15. In combination, a supply circuit, a load circuit, a transformer having primary winding means including a pair of winding sections having a common connection and having secondary winding means connected to said load circuit, a capacitance, means for charging said capacitance from said supply circuit and means connected between said capacitance and said primary winding sections for effecting alternate energization thereof by discharging said capacitance, means for limiting the inverse voltage impressed across each of the primary winding sections upon discharge of said capacitance and comprising a pair of electric valve means connected across the primary winding sections, said electric valve means being oppositely poled and having a common juncture connected to said common connection, a pair of control circuits connected to the control members of said electric valve means and each comprising a control electric discharge device having a grid, means for impressing a biasing voltage on said grids tending to maintain the electric discharge devices nonconducting, and means for selectively rendering conducting the control discharge devices and the associated electric valve means comprising a voltage divider connected across said primary winding means and comprising two pairs of serially connected resistances and inductances, criss-cross connections between the grids of said control electric discharge devices and said reistances, the inductances serving to produce voltages which neutralize the effect of said biasing potential and which continue into the regions where the reversal of polarity due to the discharge of said capacitance becomes effective.

16. In combination, a supply circuit, a load circuit, a transformer having primary winding means including a pair of winding sections and having secondary winding means connected to said load circuit, a capacitance, means for charging said capacitance from said supply circuit, a pair of electric valve means each connected to a different one of said winding sections, said electric valve means being of the type comprising control members for controlling the conductivity thereof, a control circuit connected to said control members for energizing alternately said control members and for effecting discharge of said capacitance alternately through the respective primary winding sections, and timing means for controlling the last mentioned means.

17. In combination, a supply circuit, a load circuit, a transformer having primary winding means including a pair of winding sections and having secondary winding means connected to said load circuit, a capacitance, means for charging said capacitance from said supply circuit, a pair of electric valve means each connected to a different one of said winding sections, said electric valve means being of the type comprising control members for controlling the conductivity thereof, a control circuit connected to said control members for energizing alternately the control members and for effecting discharge of said capacitance alternately through the respective primary winding sections, and timing means for producing a periodic electrical quantity for effecting periodic discharge of said capacitance through the respective electric valve means of said pair.

18. In combination, an alternating current supply circuit, a load circuit, a transformer having primary winding means including a pair of winding sections and having secondary winding means connected to said load circuit, a capacitance, means for charging said capacitance from said supply circuit, a pair of electric valve means each connected to a different one of said winding sections, said electric valve means being of the type comprising control members for controlling the conductivity thereof, a control circuit connected to said control members for energizing alternately the control members and for effecting discharge of said capacitance alternately through the respective primary winding sections, timing means connected to the last mentioned means for periodically discharging said capacitance, and means for synchronizing the operation of said timing means relative to the voltage of said supply circuit.

19. In combination, an alternating current supply circuit, a load circuit, a transformer having primary winding means including a pair of winding sections and having secondary winding means connected to said load circuit, a capacitance, means for charging said capacitance from said supply circuit, a pair of electric valve means each connected to a different one of said winding sections, said electric valve means being of the type comprising control members for controlling the conductivity thereof, a control circuit connected to said control members for energizing alternately the control members and for effecting discharge of said capacitance alternately through the respective primary winding sections, and asynchronous timing means energized from said supply circuit and connected to the last mentioned means for effecting periodic discharge of said capacitance.

20. In combination, a source of direct current, a pair of output circuits, a pair of parallel electric paths each connected to said source and each comprising in series relation a resistance, an electric discharge device having a grid and one of said output circuits, a commutating capacitance connected between said parallel electric circuits to effect commutation of current from one path to the other path when a nonconducting discharge device is rendered conducting, means connected to the grids for rendering the nonconducting discharge device conducting comprising a capacitance, means for charging said capacitance and means for discharging said capacitance through a circuit including said grids, and means connected between one discharge device and the grid of the other discharge device to produce dissymmetry in the voltages impressed on the grids by the last mentioned means in order to assure conduction by only one of the discharge devices upon energization of the grid circuits.

21. In combination, an alternating current supply circuit, a load circuit, a transformer having primary winding means including a pair of winding sections and having secondary winding means connected to said load circuit, a capacitance, means for charging said capacitance from said supply circuit, means for discharging said capacitance through said pair of winding sections alternately to effect energization of said load circuit, and means for effecting periodic discharge of said capacitance to effect periodic energization of said load circuit at a frequency different from that of said supply circuit and including means for synchronizing the charging and discharging operations of said capacitance relative to the voltage of said supply circuit.

22. In combination, an alternating current supply circuit, a load circuit, a transformer comprising primary winding means having a pair of winding sections and having secondary winding means connected to said load circuit, a capacitance, means for charging said capacitance from said supply circuit, means connected between said capacitance and said primary winding means for discharging said capacitance alternately through said winding sections, and means energized from said supply circuit for controlling said last mentioned means to effect periodic discharge of said capacitance through said primary winding means.

23. In combination, an alternating current supply circuit, a load circuit, a transformer having primary winding means including a pair of winding sections and having secondary winding means connected to said load circuit, a capacitance, means for charging said capacitance from said supply circuit, means for discharging said capacitance alternately through said winding sections, and means for synchronizing the charging and discharging operations of said capacitance relative to the voltage of said supply circuit and comprising means for producing a periodic control voltage having a period equal to or greater than the sum of the charging and the discharging periods of said capacitance.

24. In combination, an alternating current supply circuit, a load circuit, a transformer having primary winding means including a pair of winding sections and having secondary winding means connected to said load circuit, a capacitance, rectifying means for charging said capacitance from said supply circuit, electric valve means connected between said capacitance and said primary winding means for discharging said capacitance alternately through said winding sections, and means for controlling the conductivity of said electric valve means comprising means for producing a periodic control voltage having a period equal to or greater than the sum of the charging and the discharging periods of said capacitance.

25. In combination, an alternating current supply circuit, a load circuit, transforming means having primary winding means and having secondary winding means connected to said load circuit, a capacitance, means for charging said capacitance from said supply circuit, electric valve means connected between said capacitance and said primary winding means comprising two electric valves arranged to conduct current in opposite directions through said primary winding means, control means for rendering conducting alternately said pair of electric valves, and timing means energized from said supply circuit and connected to said control means for producing a periodic timing voltage having a period equal to or greater than the sum of the charging and the discharging periods of said capacitance.

26. In combination, an alternating current supply circuit, a load circuit, a transformer having primary winding means including a pair of primary winding sections and having secondary winding means connected to said load circuit, a capacitance, rectifying means for charging said capacitance from said supply circuit, a pair of electric valve means each connected between said capacitance and a different one of said primary winding sections and poled to conduct current in opposite directions through said primary winding means, a control circuit for rendering said electric valve means conducting alternately, and timing means energized from said supply circuit for synchronizing the charging and discharging operations of said capacitance.

27. In combination, an alternating current supply circuit, a load circuit, a capacitance, means for charging said capacitance from said supply circuit and comprising electric valve means having a control member, means for periodically discharging said capacitance to effect energization of said load circuit and comprising a timing circuit for producing a periodic control voltage, and means responsive to said periodic control voltage for impressing on said control member a hold-off voltage to maintain said electric valve means nonconducting during each discharge of said capacitance.

28. In combination, a capacitance, means for charging said capacitance, a transformer having primary winding means and secondary winding means connected to a load circuit, means for transmitting current from said capacitance through said primary winding means in either direction, and a pair of reversely connected electric valve means connected to said primary winding means for preventing substantial reversal of the polarity of said capacitance upon discharge of said capacitance through said primary winding means.

29. In combination, a supply circuit, a load circuit, a capacitance, means for charging said capacitance from said supply circuit, transforming means connected to said load circuit and comprising primary winding means, means connected between said primary winding means and said capacitance for selectively controlling the direction of current flow through said primary winding means, a pair of reversely connected electric valve means connected to said transforming means, and means for selectively controlling the conductivities of said electric valve means to prevent substantial reversal in the polarity of the voltage of said capacitance upon discharge thereof through said primary winding means.

30. In combination, a supply circuit, a load circuit, a capacitance, means for charging said capacitance from said supply circuit, transforming means connected to said load circuit and comprising primary winding means, means connected between said primary winding means and said capacitance for selectively controlling the direction of current flow through said primary winding means, a pair of normally nonconductive electric valve means connected reversely in parallel and connected to said transforming means, and means responsive to the direction of current flow through said transforming means to control selectively the conductivities of said electric valve means.

31. In combination, a supply circuit, a load circuit, a capacitance, means for charging said capacitance from said supply circuit, means for periodically discharging said capacitance to effect energization of said load circuit, and timing means for producing a periodic control voltage for controlling said charging means and the discharging means and having a period equal to or greater than the sum of the charging and discharging periods of said capacitance.

32. In combinaion, a supply circuit, a load circuit, transforming means connected to said load circuit, discharging means for said capacitance and connected between said capacitance and said supply circuit, control means for said charging means, means for discharging said capacitance through said transforming means to effect energization of said load circuit, control means for the discharging means, and timing means for controlling the control means for said charging means and the control means for said discharging means and producing a periodic timing voltage having a period equal to or greater than the sum of the charging and discharging periods of said capacitance.

33. In combination, an alternating current supply circuit, a load circuit, transforming means connected to said load circuit, a capacitance, electric valve means connected between said supply circuit and said capacitance for charging said capacitance, control means for said electric valve means, means for discharging said capacitance through said transforming means to effect energization of said load circuit and comprising a second electric valve means, control means for said second electric valve means, and timing means for controlling the first mentioned and second mentioned electric valve means through the respective associated control means and comprising means for producing a periodic timing voltage having a period equal to or greater than the sum of the charging and discharging periods of said capacitance.

ORRIN W. LIVINGSTON.

DISCLAIMER 2,294,671.—*Orrin W. Livingston*, Scotia, N. Y. Electric Translating System. Patent dated September 1, 1942. Disclaimer filed December 1, 1943, by the assignee, *General Electric Company*.

Hereby enters this disclaimer to claims 1, 3, 4, 5, 6, 7, 8, 9, 10, 11, 28, 29, and 30 of said patent.

[*Official Gazette December 21, 1943.*]